United States Patent [19]
Witkowski et al.

[11] Patent Number: 5,470,149
[45] Date of Patent: Nov. 28, 1995

[54] AIR SPARGER FOR AGITATING SOLID-LIQUID SUSPENSIONS

[75] Inventors: Joseph T. Witkowski, Baltimore, Md.; Steve D. Raffensperger, Sylvania, Ohio

[73] Assignee: Martin Marietta Magnesia Specialties Inc., Raleigh, N.C.

[21] Appl. No.: 305,319

[22] Filed: Sep. 15, 1994

[51] Int. Cl.⁶ .................................................. B01F 13/02
[52] U.S. Cl. ........................ 366/101; 134/166 R; 261/124
[58] Field of Search .................................. 366/101, 107; 261/124; 134/166 R, 169 R; 222/195

[56] References Cited

U.S. PATENT DOCUMENTS

| | | | |
|---|---|---|---|
| 2,583,725 | 1/1952 | Brown et al. | 261/124 |
| 3,810,604 | 5/1974 | Reiter | 366/101 X |
| 4,913,819 | 4/1990 | Patterson | 134/166 R X |
| 5,013,530 | 5/1991 | McGregor. | |
| 5,222,512 | 6/1993 | McGregor. | |

OTHER PUBLICATIONS

Chemical Engineering, vol. 87, No. 17, Aug. 25, 1980, pp. 91–94; William H. Mink, Battelle Columbus Laboratories, Columbus, Oh.: *Program calculates orifice sizes for gas flows.*
Chemical Engineering, vol. 88, No. 7, Apr. 6, 1981, pp. 93–95; William H. Mink, Battelle Columbus Laboratories, Columbus, Oh.: *Hole–area distribution for liquid spargers–A correction.*
Chemical Engineering, vol. 87, No. 23, Nov. 17, 1980, pp. 277–281; William H. Mink, Battelle Columbus Laboratories, Columbus, Oh.: *Calculating hole–area distribution for liquid spargers.*
Chemical Engineering, vol. 95, No. 10, (1988), pp. 95–98, J. B. Riggs: *Simplified Manifold Design.*
Aiche Journal, vol. 24, No. 3, May 1978, pp. 454–466, S. M. Bhavaraju et al.: *The Design of Gas Sparged Devices for Viscous Liquid Systems.*
Chemical Engineering Journal, vol. 33, No. 2 (1986), pp. 63–69, M. W. Haque et al.: *Optimum Gas Sparger Design for Bubble Columns with a Low Height–to–Diameter Ratio.*
Chemical Engineering, vol. 88, No. 5, (1981), pp. 116–117, Kent S. Knaebel: *Simplified Sparger Design.*
McGraw–Hill, New York, 1974, pp. 180–186, C. O. Bennett et al.: *Momentum, Heat, and Mass Transfer, 2nd ed. (Fluid Dynamics).*
John Wiley & Sons, 1960, pp. 185–188, R. B. Bird et al.: *Transport Phenomena (Friction Factors for Flow in Tubes).*
Perry's Chemical Enginees' Handbook, 6th ed., McGraw–Hill, New York, 1984, pp. 18–61 to 18–62, R. H. Perry et al.
Perry's Chemical Engineers' Handbook, 5th ed., McGraw–Hill, New York, 1973, pp. 19–12, R. H. Perry et al.
Chemical Process Equipment Selection and Design, Butterworth Publishers, Boston, 1988, p. xvii, S. M. Wallas: *Rule 5, Mixing and Agitation.*

Primary Examiner—Charles E. Cooley
Attorney, Agent, or Firm—Gay Chin; Carlos A. Nieves; Patrick J. Fay

[57] ABSTRACT

A sparger system for mixing a solid/liquid suspension in a cylindrical container comprises a sparger pipe which extends substantially parallel to the longitudinal axis of the container. The sparger pipe is separated from an inner wall of the container by a first distance and a first end portion of the sparger pipe extends through a side wall of the container. A first flange member is releasably coupled to the first end portion of the sparger pipe so that, when the first flange member is coupled to the first end portion of the sparger pipe, the first end of the sparger pipe is sealed. The flange member may be removed from the first end portion of the sparger so that pressurized liquid may be introduced directly into the sparger pipe to clean the sparger pipe and the container. A fluid passage is coupled to the sparger pipe and extends to an opening which is above a maximum level of liquid to be stored in the container. A plurality of orifices formed substantially in a line along the sparger pipe are oriented so that when a pressurized gas is introduced into the sparger pipe, the gas leaves the orifices directed toward the bottom center line.

16 Claims, 6 Drawing Sheets

AIR SPARGER FOR AGITATING SOLID-LIQUID SUSPENSIONS

FIELD OF THE INVENTION

The present invention relates generally to apparatus for agitating solid/liquid suspensions and more particularly relates to spargers for agitating pseudo-homogeneous solid/liquid suspensions such as Magnesium Hydroxide slurry stored in rail tank cars.

BACKGROUND OF THE INVENTION

During transportation in rail tank cars, pseudo-homogeneous solid/liquid suspensions tend to settle so that the solid particles are often much more densely concentrated near the bottom of the rail car tank than in other areas of the tank. If this slurry is not properly distributed prior to unloading, much of the solid may be left in the rail tank car after all of the liquid has been pumped out.

Known rail tank cars have included sparger systems to distribute these particles within the liquid. These sparger systems have included a vertical syphon tube coupled via a standard "tee" fitting to a sparger pipe located along a central axis of the rail tank car. However, rail tank cars including such known sparger systems employed by the assignee of this patent application have failed to effect a homogeneous distribution of the solid particles and have left residual tacky deposits of magnesium hydroxide. These deposits must be removed from the interior of the rail tank car and from the interior of the sparger pipe after unloading the slurry. Cleaning fluid (e.g. water for flushing magnesium hydroxide) is introduced into the vertical syphon tube under pressure and forced out through the openings in the sparger pipe to clean the system. However, due to the large pressure loss occurring at the "tee" fitting and the consequent maldistribution of the cleaning fluid along the array of sparger pipe openings, much residue is left within the rail tank car and within and on the sparger pipe 20. Thus an additional cleaning process is required in which personnel must enter the interior of the rail tank car. This process is time consuming, expensive and potentially dangerous to the personnel performing the operation. When required to enter the rail tank car to perform the cleaning operation, personnel are subject to several hazards including potential suffocation in an accidentally sealed tank car, drowning in liquid remaining in the tank car and injuries resulting from falls from atop or inside the tank car. Falls within the car may also damage the car itself or the sparger pipe. This is especially true when personnel enter the car carrying equipment. In addition, this cleaning operation increases the time required to return the rail tank car to use and usually wastes the material not unloaded with the slurry.

To prevent the back-flow of slurry into the sparger pipe, prior art systems have employed various means including reduced diameter nozzles to elastomeric check valves. However, these features increase the cost of the system as well as the cost of maintaining the system. Moving parts and reduced diameter nozzles add to the probability of clogging with tacky or lodged solids and the added fittings may fail releasing into the slurry broken pieces which can damage the pumps used in unloading. In addition, personnel must enter the rail tank car to service these components as they are located within the car.

Thus there is a need for a sparger system which reduces the amount of residue left in a rail tank car after a solid/liquid suspension has been unloaded and which allows the rail tank car and the sparger system to be quickly and effectively cleaned.

There is also a need for a sparger system which reduces the need for personnel to enter the rail tank car and which effectively distributes the solid particles throughout the slurry to form a pseudo-homogeneous solid/liquid suspension prior to unloading.

SUMMARY OF THE INVENTION

The present invention is directed to a sparger system for mixing the contents of a cylindrical container including a liquid. The sparger system includes a sparger pipe extending substantially parallel to the longitudinal axis of the container, wherein the sparger pipe includes plurality of orifices formed substantially in a line oriented so that when a pressurized gas is introduced into the sparger pipe, the gas leaves the orifices directed toward the bottom center line. A first end portion of the sparger pipe extends through the first side wall or end bell of the container. A first flange member is releasably coupled to the first end portion of the sparger pipe to seal the first end of the sparge pipe and a fluid passage having an opening which is above a maximum level of liquid to be stored in the container, is coupled to the sparger pipe.

Alternate embodiments of the invention include a sparger pipe which is positioned off-center within the cylindrical container so that a mixing effect caused by the sparging operation is maximized.

BRIEF DESCRIPTION OF THE DRAWINGS

FIG. 7 shows a second end portion of a sparger pipe according to the alternate embodiment of the present invention.

DETAILED DESCRIPTION

Figure 1:
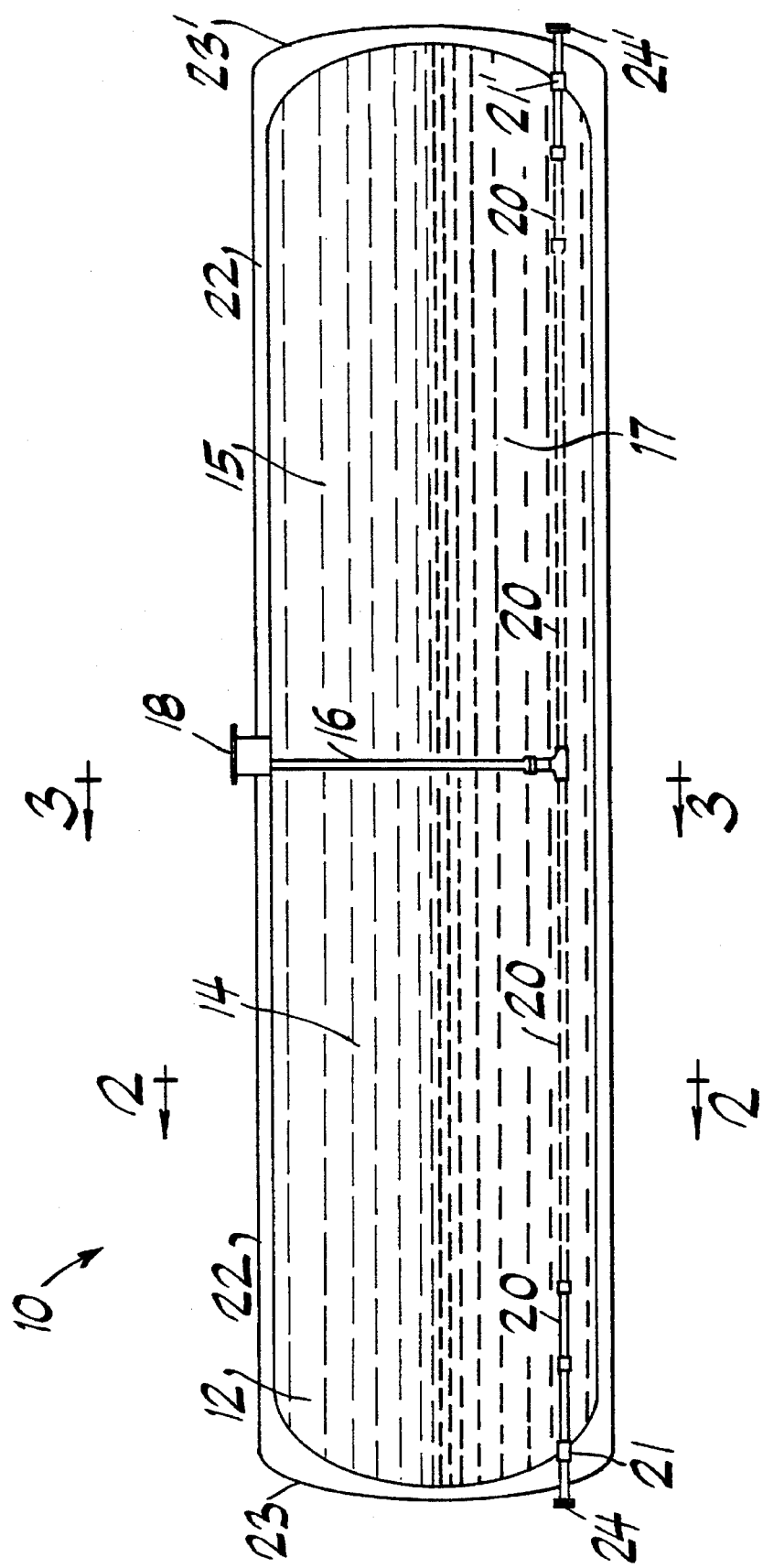
FIG. 1 shows a side cross-sectional view of a rail tank car including a sparger system according to the present invention.

As shown in FIGS. 1–4, a sparger system according to the present invention may be included in a rail tank car 10. The distances and measurements used in determining the dimensions of the preferred sparger system are based on a rail tank car approximately 34' long and with an inner diameter of 103". The rail tank car 10 includes a substantially cylindrical interior chamber 12 formed by a substantially cylindrical wall 22 which has been loaded with a solid/liquid suspension 14 which is preferably a magnesium hydroxide slurry but which may be any solid/liquid suspension and preferably is a pseudo-homogeneous suspension undergoing hindered gravity settling such as, for example, titanium oxide or antimony oxide slurry. As seen in FIG. 1, the solid/liquid suspension 14 has settled toward the bottom of the interior chamber 12 forming a weakly concentrated upper layer 15 and a more densely concentrated and more viscous lower layer 17.

The rail tank car 10 includes a pipe 16 which extends from an opening 18 down to a substantially horizontal sparger pipe 20. Typically, the end of the pipe 16 mates with a sparging air supply hose via a universal air fitting. A ball valve downstream of the universal fitting closes this line when not in service. The sparger pipe 20 extends across the entire length of the interior chamber 12, through the side walls 23 and 23' of the rail tank car 10 to clean-out flanges 24 and 24' which are sealed during both transport of the tank and normal sparging operations. Those skilled in the art will recognize that the standard syphon pipe included in many existing rail tank cars may be coupled to the sparger pipe 20 and may serve as the pipe 16. The sparger pipe 20 is supported by sparger pipe stands 26 which rest on the interior surface of the interior chamber 12. The centers of the sparger pipe stands 26, in the preferred embodiment, are located approximately 9.75" in arc length away from the bottom center line, BL of the inner chamber 12 and maintain the sparger pipe 20 in a position in which an inner edge of the sparger pipe 20 is approximately 5" from the wall of the inner chamber 12. For different size cylindrical chambers, the sparger pipe centerline may preferably be located a distance approximately 8–14% of the radius of the inner chamber 12 away from the wall of the inner chamber 12. This distance is more preferably approximately 12% of the radius of the cylindrical container.

Figure 2:
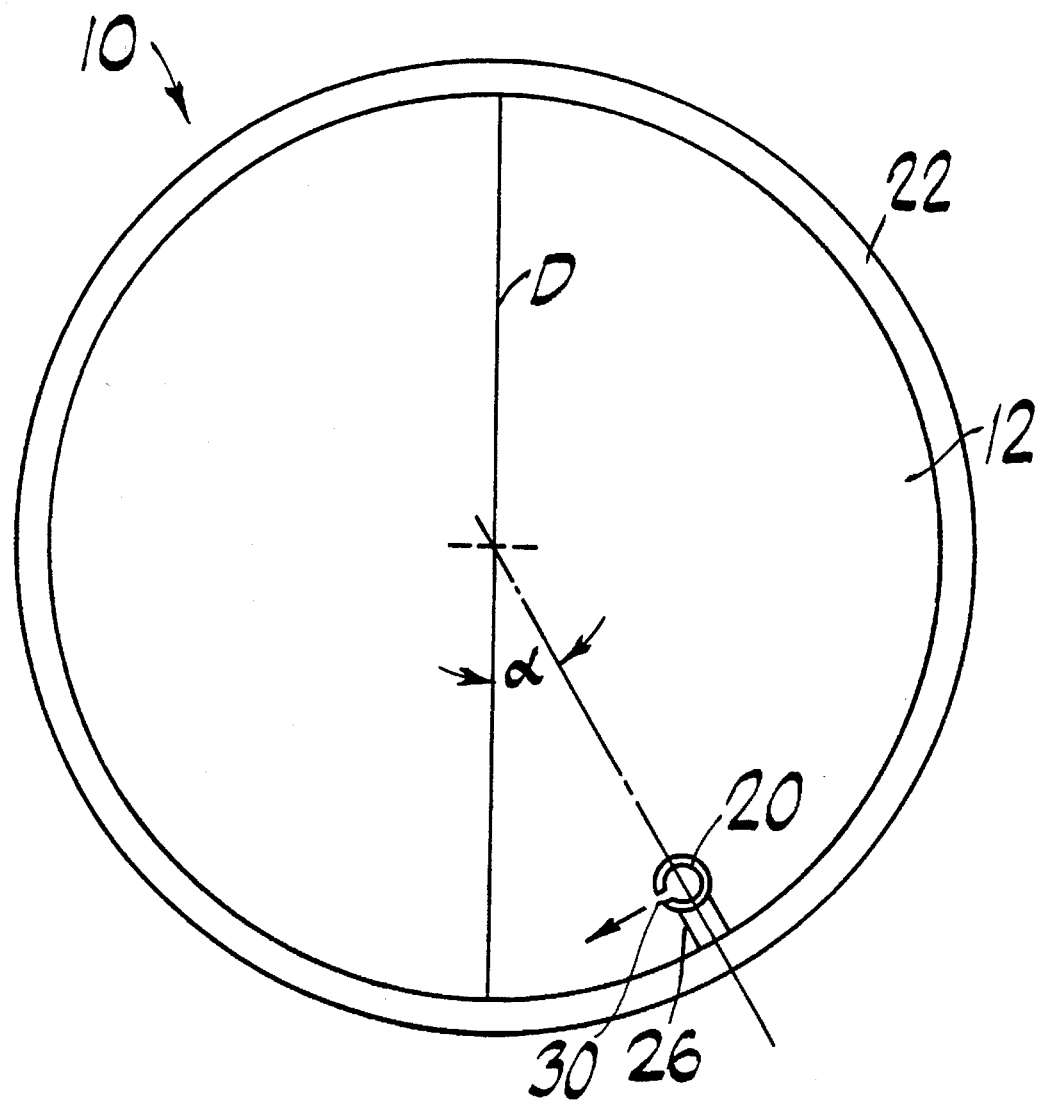
FIG. 2 shows a front cross-sectional view of a rail tank car including a sparger system according to the present invention taken along line 2—2 of FIG. 1.
Figure 3:
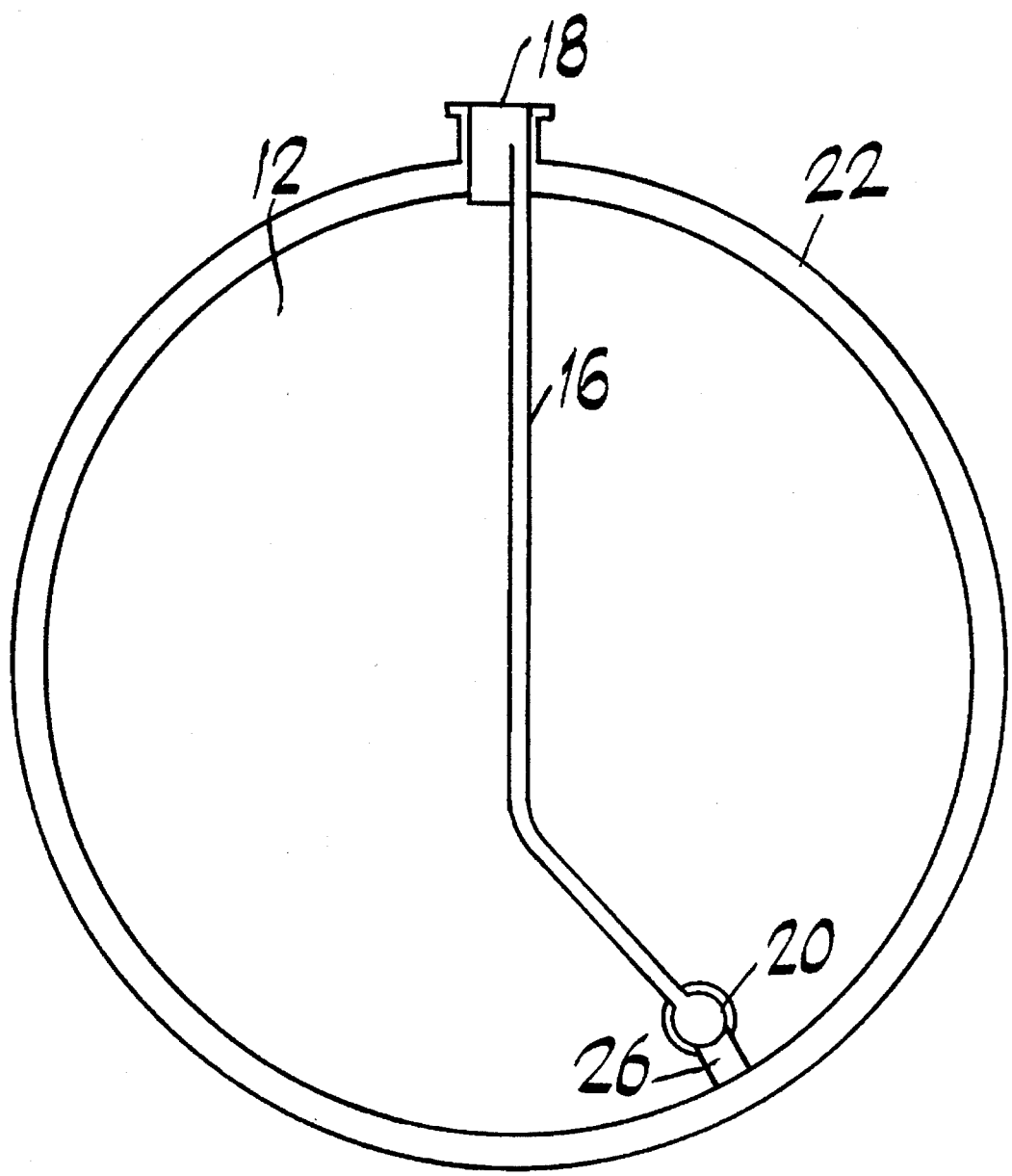
FIG. 3 shows a front cross-sectional view of a rail tank car including a sparger system according to the present invention taken along line 3—3 of FIG. 1.

As seen in FIG. 2, the sparger pipe 20 is displaced with respect to the center line D of the interior chamber 12. The sparger pipe 20 is located on a radius of the interior chamber 12 which is displaced by an angle α from a substantially vertical diameter D. The angle α is preferably between 9° and 12° and is more preferably approximately 10.8°. The sparger pipe 20 includes a plurality of orifices 30 which are distributed, substantially evenly spaced along the length of the sparger pipe 20. The orifices 30 are arranged substantially in a line along the surface of the sparger pipe 20 so that a stream of gas leaving each of the orifices 30 is substantially parallel to the streams of gas leaving the other orifices 30. The line of orifices 30 are preferably arranged so that the streams of gas leave the sparger pipe 20 approximately perpendicular to a radius of the interior chamber 12 of the rail tank car 10 on which the sparger pipe axis lies. In the preferred embodiment, this angle is approximately 79°.

The syphon pipe 16 and the sparger pipe 20 may be 2" diameter schedule 40 carbon steel pipe and the orifices 30 are preferably approximately 0.375" in diameter and are preferably spaced approximately 12" center to center along the sparger pipe 20. However, those skilled in the art will recognize that the diameter of the pipes 16 and 20 and the size and distribution of the orifices 30 will vary depending upon the particular solid/liquid suspension being transported and on the desired flow rate, fluid properties and pressure of the sparging gas.

Figure 4:
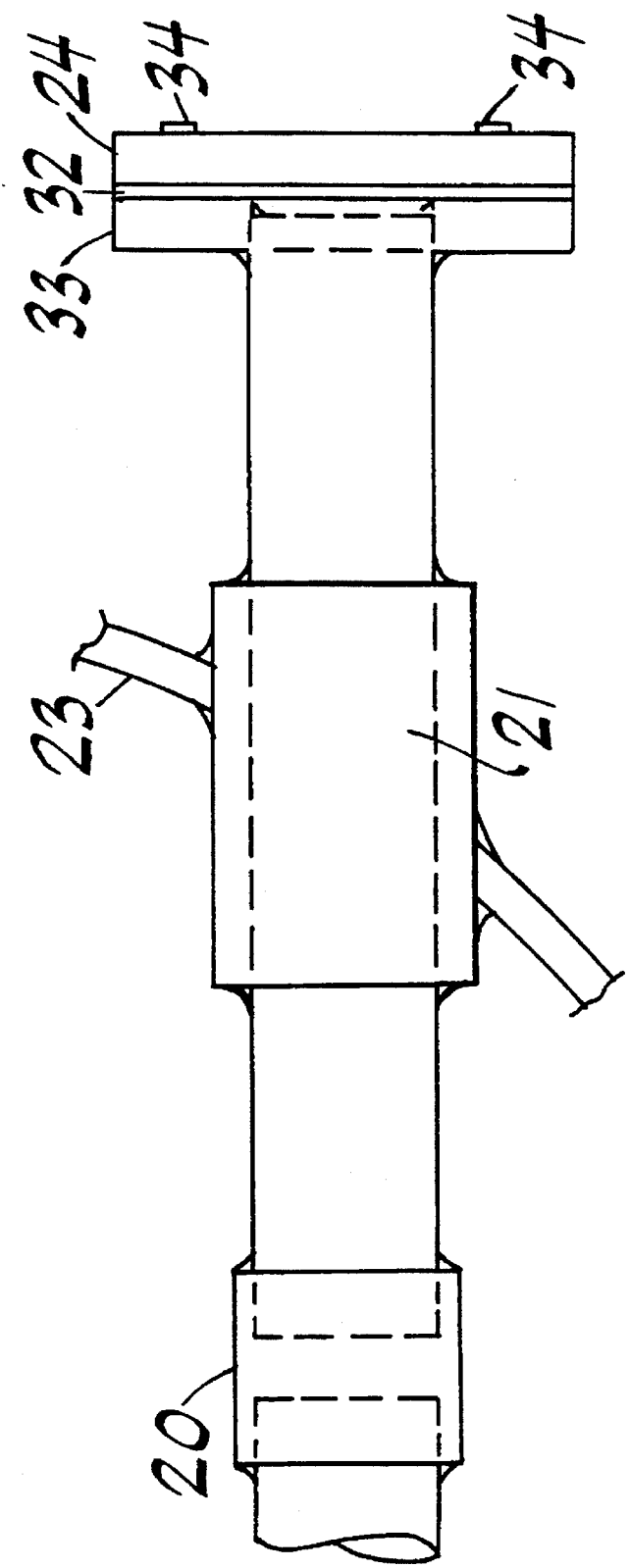
FIG. 4 shows a side view of an end portion of a sparger pipe included in a sparger system according to the present invention.

As seen in FIG. 4 and 7, a first end of the sparger pipe 20 extends through a first side wall or end bell 23 of the rail tank car 10 to an end which is sealed with a flange 24 while the second end of the sparger pipe 20 extends through the opposite end of the rail tank car 10 to a flange 24'. As seen in FIG. 4 and 7, the portions of the sparger pipe 20 which penetrates the end bells 23 of the rail tank car 10 have been reinforced with sleeves 21 and 21', respectively. Gaskets 32 and 32' are sealed between the flanges 24 and 24' and the first and second ends 33 and 33', respectively, of the pipe 20, respectively. Bolts 34 secure the flange 24 to the first end of the pipe 20 compressing the gasket 32 therebetween while bolts 34' secure the flange 24' to the second end compressing the gasket 32' therebetween. The arrangement of the second end portion of the sparger pipe 20 and the second flange member 24' passing through and extending outside of the second end bell 23' is the same as that described in reference to the first end of the sparger pipe 20.

Figure 5:
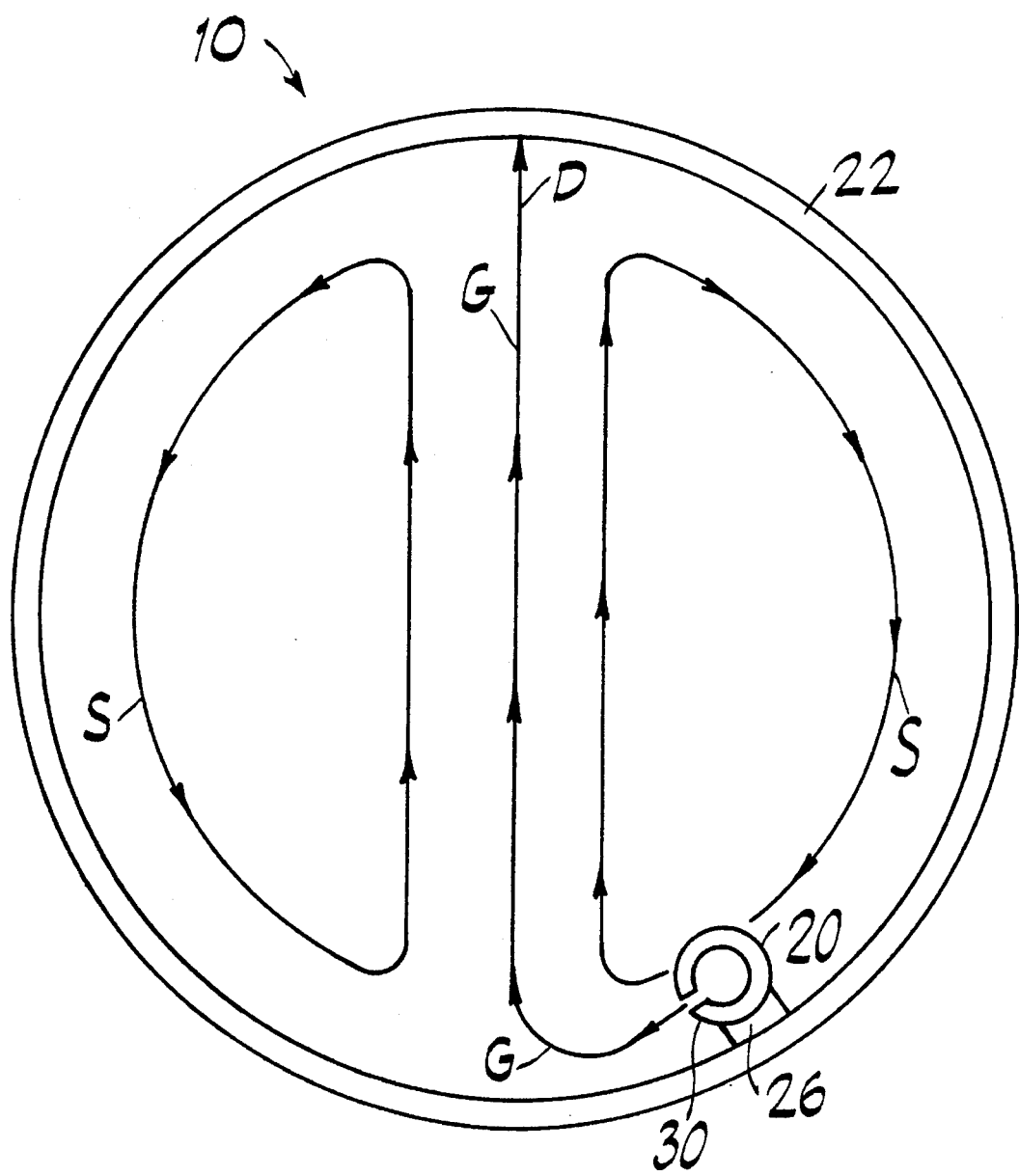
FIG. 5 is a front cross-sectional view of a rail car tank including a sparger system according to the present invention illustrating the direction of flow of the liquid and of the sparge gas within the rail tank car.

In operation, when it is desired to unload the solid/liquid suspension, the pipe 16 is connected to a source of compressed air (not shown), or other suitable pressurized gas 38, via the opening 18 while the flanges 24 and 24' are maintained sealed. The compressed air flows through the pipe 16 into the sparger pipe 20 and out through the orifices 30 into the interior chamber 12. As seen in FIG. 5, the gas which bubbles out of the orifices 30 moves downward for a short while toward the bottom of the interior chamber 12 along the gas flow path G and then rises up near the vertical diameter D to the top of the interior chamber 12. This creates a dual swirl in the solid/liquid suspension with the liquid and the suspended solid particles moving via buoyancy forces along the swirl paths S around the surface of the interior chamber 12 to the bottom of the chamber 12 where they are drawn upward with the bubbling sparging gas near the vertical diameter of the interior chamber 12. The downward directed stream of bubbles scours the bottom of the interior chamber 12, mobilizing the solid particles and creating the dual swirling motion which distributes the solid particles and the liquid substantially homogeneously throughout the entire volume of the interior chamber 12. After the desired distribution of the solid/liquid suspension has been achieved, the suspension is unloaded through a drain (not shown) which may be located in the bottom center of the inner chamber 12, as with prior art systems. The superior mixing and more homogeneous distribution of the solid particles results in reduced unloading times and a significant decrease in the amount of residue left in the interior chamber 12 and within the sparger pipe 20 of the present invention.

Those skilled in the art will recognize that the size and distribution of the orifices 30 and the pressure of the sparging gas may be varied so long as a gas flow is uniformly distributed among the orifices and the bubbles of sparging gas rise close to the vertical diameter of the interior chamber 12. In addition, it will be recognized that the pipe 16 and the opening 18 need not be positioned near the center line of the rail tank car 10. So long as the opening 18 and the mouth of the pipe 16 are above the level of the liquid in the interior chamber 16 and the system has been properly vented, the liquid will not leak from the rail tank car.

After the solid/liquid suspension has been unloaded below the level of the sparger pipe 20, any residue left in the rail tank car 10 and the sparger pipe 20 may be cleaned without the entry of personnel into the interior chamber 12. Bolts 34 are removed from the flange 24 and the flange 24 is separated from the first end of the sparger pipe 20. A source of pressurized water or other cleaning fluid (not shown) is then coupled to the first end of the sparger pipe 20 while the second end of the sparger pipe 20 remains sealed by the flange 24' and the pressurized fluid is forced down the length of the sparger pipe 20 and through the orifices 30 in the sparger pipe 20 into the interior chamber 12 of the rail tank car 10. As the cleaning fluid is introduced directly into the sparger pipe 20 without passing through perpendicular pipe 16 and the "tee" fitting, and without incurring the attendant frictional pressure losses, the pressurized fluid flows through the sparger pipe 20 and the orifices 30 at high pressure and effectively cleans both the sparger pipe 20 and the walls of the interior chamber 12. The flange 24 is then re-bolted onto the first end of the sparger pipe 20 which is, consequently, resealed. The bolts 34' are then removed from the second end of the sparger pipe 20 and the flange 24' is removed. The source of pressurized cleaning fluid is then coupled to the second end of the sparger pipe 20 while the first end is sealed. Alternatively, the flanges may be removed from the first and second ends of the sparger pipe 20 at the conclusion of the cleaning operation to prevent the accumulation of solids very near the ends of the sparger pipe 20 in case some residue has been pushed from the last opened flange to the opposite flange. As cleaning fluid is forced through the sparger pipe 20 and the orifices 30 at high pressure, any remaining residue is removed from the sparger pipe 20 and the walls of the interior chamber 12 of the rail tank car 10.

Figure 6:
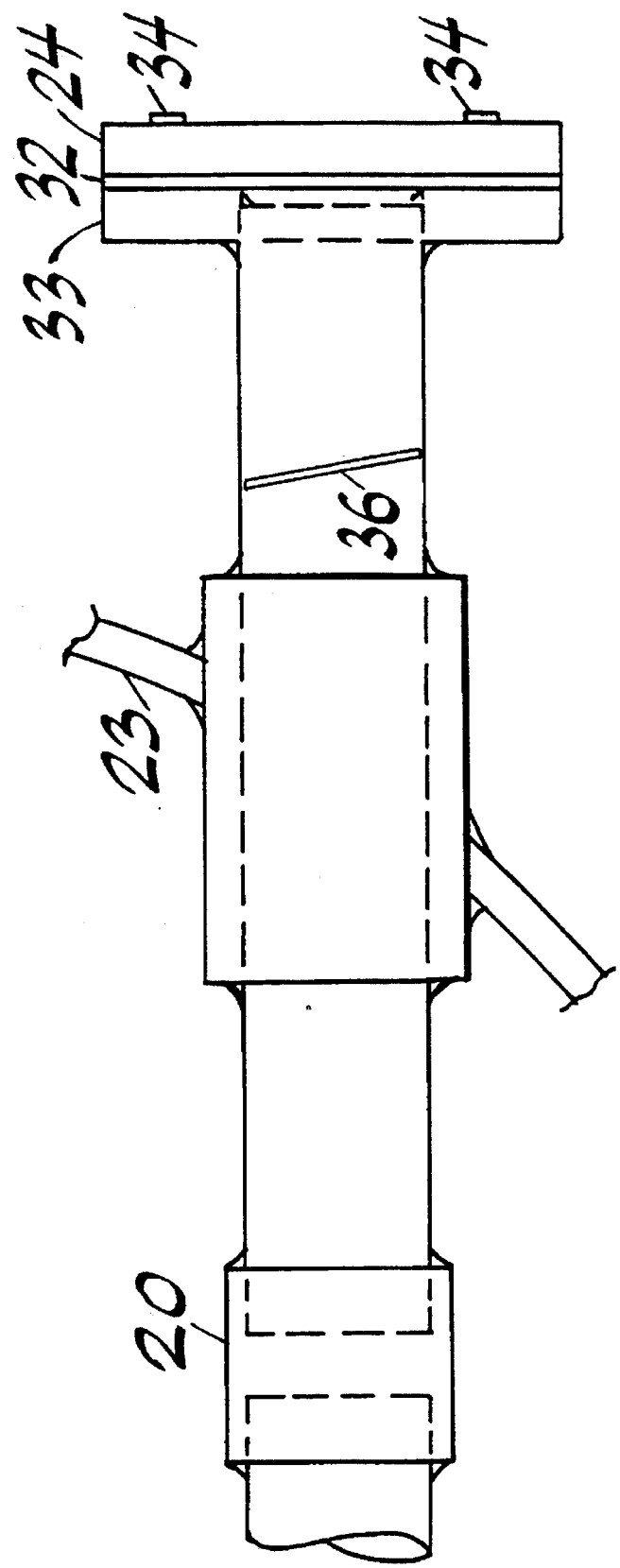
FIG. 6 shows first end portion of a sparger pipe according to an alternate embodiment of the present invention.

FIG. 6 shows an end portion of a sparger pipe 20 according to an alternate embodiment of the present invention in which corresponding elements are identified by the same reference numbers. The sparger pipe 20 according to this embodiment includes a check valve 36 upstream of the flange 24. The check valve 36 prevents the flow of slurry out of the sparger pipe 20 in the case where the flange 24 is accidentally left off of the first end of the sparger pipe 20 while the level of liquid in the rail tank car 10 is above the level of the sparger pipe 20. In addition, a second check valve 36' (FIG. 7) configured as valve 36 may be provided on the second end of the sparger pipe 20.

Those skilled in the art will recognize that the sparger system according to the present invention is not useful only for solid/liquid suspensions. This invention may also be used with containers carrying solutions in order to remix and dissolve a precipitate which has come out of solution. Those skilled in the art will also recognize that, while the described embodiment is shown in place in a rail tank car having a flat bottom, a sparger system according to the present invention may also be employed in rail tank cars or other containers having any of various sloped bottom configurations. In these systems, the angular orientation of the sparger pipe relative to the container center line will be defined as in the described embodiments and, while preferably maintaining the sparger pipe straight, the distance of the sparger pipe center line from the inner wall of the container described above may preferably refer to a minimum distance between the sparger pipe and the inner wall of the container. In such an embodiment of the present invention, the sparger pipe stands 26 need only be made of varying heights to maintain the sparger pipe at a uniform elevation as the lower surface of the container slopes downward. Alternatively, it may be desirable to employ a sparger pipe shaped to shadow the contour of the container bottom. This would allow the distance between the sparger pipe and the inner wall of the container to remain constant.

There are various advantageous modifications which may be apparent to those skilled in the art. However, these modifications are considered within the scope of the present invention. Thus, the described embodiments are illustrative only and are not intended to limit the scope of the invention which is to be defined only by the claims appended hereto.

What is claimed is:

1. A sparger system for mixing the contents of a substantially cylindrical container including a liquid, wherein when the container is in a reference position, a longitudinal axis of the container extends in a substantially horizontal direction so that a bottom center line of the container is located directly below the longitudinal axis, the system comprising:

an inner wall of the container defining a chamber for receiving the liquid;

a sparger pipe which extends substantially parallel to the longitudinal axis of the container with a centerline of the sparger pipe being separated from the inner wall of the container by a first distance and wherein the sparger pipe is displaced relative to the bottom center line so that a radius of the container passing through the sparger pipe is separated from a radius connecting the longitudinal axis and the bottom center line by a first angle, the first angle being between 9° and 12°;

a fluid passage having an opening which is above a maximum level of the liquid to be stored in the container, wherein the fluid passage is coupled to the sparger pipe; and a plurality of orifices disposed substantially in a line along the sparger pipe, wherein the plurality of orifices are oriented so that when a pressurized gas is introduced into the sparger pipe, the gas leaves the orifices directed toward the bottom center line.

2. A sparger system according to claim 1, wherein the first distance is selected to be between 8 and 14% of the length of the radius of the container.

3. A sparger system according to claim 2, wherein the first distance is selected to be approximately 12% of the length of the radius of the container.

4. A sparger system according to claim 1, wherein the first angle is approximately 10.8°.

5. A sparger system according to claim 1, wherein the orifices are oriented so that gas leaving the sparger pipe is directed substantially perpendicular to the radius of the container passing through the sparger pipe.

6. A sparger system according to claim 1, wherein the container includes first and second side walls which seal first and second ends of the container, respectively, and wherein a first end portion of the sparger pipe extends through the first side wall and a second end portion of the sparger pipe extends through the second side wall.

7. A sparger system according to claim 6, wherein the first end portion of the sparger pipe includes a first removable flange plate located outside of the container which, when coupled to the sparger pipe, seals the first end portion of the sparger pipe and wherein the second end portion of the sparger pipe includes a second removable flange plate located outside of the container which, when coupled to the sparger pipe, seals the second end portion of the sparger pipe.

8. A sparger system according to claim 1, wherein the fluid passage opening is adapted to be coupled to a source of pressurized gas so that the pressurized gas flows through the fluid passage to the sparger pipe and out of the orifices into the container.

9. A sparger system for mixing the contents of a substantially cylindrical container including a liquid wherein, when the container is in a reference position, a longitudinal axis of the container extends in a substantially horizontal direction directly above a bottom center line of the container, the system comprising:

an inner wall of the container defining a chamber for receiving the liquid;

a sparger pipe which extends substantially parallel to the longitudinal axis of the container so that a centerline of the sparger pipe is separated from the inner wall of the container by a first distance and wherein a first end portion of the sparger pipe extends through a first wall of the container and includes a first end of the sparger pipe;

a first flange member releasably coupled to the first end portion of the sparger pipe so that, when the first flange member is coupled to the first end portion of the sparger pipe, the first end of the sparger pipe is sealed;

a fluid passage coupled to the sparger pipe, the fluid passage having an opening which is above a maximum level of the liquid to be stored in the container; and a plurality of orifices disposed substantially in a line along the sparger pipe, the plurality of orifices being oriented so that, when a pressurized gas is introduced into the sparger pipe, the gas leaves the orifices directed toward the bottom center line.

10. A sparger system according to claim 9, wherein a second end portion of the sparger pipe includes a second end of the sparger pipe and extends through a second wall of the container and wherein a second flange member is releasably coupled to the second end portion of the sparger pipe so that, when the second flange member is coupled to the second end portion of the sparger pipe, the second end of the sparger pipe is sealed.

11. A sparger system according to claim 9, further comprising a first check valve disposed within the first end portion of the sparger pipe so that the check valve is located outside of the container, wherein the first check valve is biased to prevent the outflow of liquid from the first end of the sparger pipe when the first flange member is removed.

12. A sparger system according to claim 9, wherein the orifices are oriented so that gas leaving the sparger pipe is directed substantially perpendicular to a radius of the substantially cylindrical container passing through the sparger pipe.

13. A sparger system according to claim 9, wherein the first distance is selected to be approximately 12% of the length of a radius of the substantially cylindrical container.

14. A sparger system according to claim 9, wherein the container is a rail tank car.

15. A sparger system for mixing the contents of a container including a liquid comprising:

a container including a liquid holding chamber formed by a substantially cylindrical inner wall wherein, when the container is in a reference position, a longitudinal axis of the container extends in a substantially horizontal direction directly above a bottom center line of the container, the container including first and second end walls coupled to the inner wall to seal first and second ends of the liquid holding chamber, respectively;

a sparger pipe extending substantially parallel to the longitudinal axis of the container, wherein a centerline of the sparger pipe is separated from the inner wall of the container by a first distance and wherein a first end portion of the sparger pipe including a first end of the sparger pipe extends through the first end wall;

a first flange member releasably coupled to the first end portion of the sparger pipe so that, when the first flange member is coupled to the first end portion of the sparger pipe, the first end of the sparger pipe is sealed;

a fluid passage coupled to the sparger pipe, the fluid passage having an opening which, when the container is in the reference position, is above a maximum level of the liquid to be stored in the container; and a plurality of orifices disposed substantially in a line along the sparger pipe, the plurality of orifices being oriented so that when a pressurized gas is introduced into the sparger pipe, the gas leaves the orifices directed toward the bottom center line.

16. A sparger system according to claim 15, wherein a cross-section of the liquid holding chamber, in a plane substantially perpendicular to the longitudinal axis of the container, is substantially circular.

* * * * *